US012017468B2

(12) United States Patent
Shkolnikov et al.

(10) Patent No.: US 12,017,468 B2
(45) Date of Patent: Jun. 25, 2024

(54) IMAGE FORMATION WITH ELECTROOSMOTIC LIQUID REMOVAL

(71) Applicant: Hewlett-Packard Development Company, L.P., Spring, TX (US)

(72) Inventors: Viktor Shkolnikov, Palo Alto, CA (US); Omer Gila, Palo Alto, CA (US); Napoleon J Leoni, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/754,866

(22) PCT Filed: Nov. 14, 2019

(86) PCT No.: PCT/US2019/061393
§ 371 (c)(1),
(2) Date: Apr. 14, 2022

(87) PCT Pub. No.: WO2021/096506
PCT Pub. Date: May 20, 2021

(65) Prior Publication Data

US 2024/0092104 A1 Mar. 21, 2024

(51) Int. Cl.
*B41J 2/095* (2006.01)
*B41J 2/04* (2006.01)
*B41J 29/17* (2006.01)

(52) U.S. Cl.
CPC ................ *B41J 29/17* (2013.01); *B41J 2/04* (2013.01); *B41J 2/095* (2013.01); *B41J 2002/043* (2013.01)

(58) Field of Classification Search
CPC ........ B41J 2/04; B41J 2/095; B41J 2002/043; B41J 29/17; B41J 2/165; B41J 2/16538; B41J 2002/16502; B41J 2002/061
See application file for complete search history.

(56) References Cited

U.S. PATENT DOCUMENTS 4,387,382 A 6/1983 Kohashi
5,352,558 A 10/1994 Simms et al.
5,552,869 A 9/1996 Schilli et al.
5,841,456 A 11/1998 Takei et al.
6,386,696 B1 * 5/2002 Rodi ........................ B41M 1/00 347/213

(Continued)

FOREIGN PATENT DOCUMENTS

CN 1519112 A 8/2004
CN 101466548 A 6/2009

(Continued)

*Primary Examiner* — Kristal Feggins
(74) *Attorney, Agent, or Firm* — Michael Dryja

(57) ABSTRACT

An image formation device includes a support, a fluid ejection device, and a first porous element. The support is to support movement of a substrate along a travel path, while the fluid ejection device is located along the travel path to deposit droplets of ink particles within a liquid carrier onto the substrate to at least partially form an image on the substrate. The first porous element is located downstream along the travel path from the fluid ejection device to be in contact against the substrate to remove, via electroosmotic flow through the first porous element, at least a portion of the liquid carrier from the substrate.

15 Claims, 10 Drawing Sheets

(56) References Cited

U.S. PATENT DOCUMENTS

| | | | |
|---|---|---|---|
| 6,550,905 | B1 | 4/2003 | Deckers |
| 6,650,856 | B2 | 11/2003 | Ahn et al. |
| 6,719,423 | B2 | 4/2004 | Chowdry et al. |
| 7,497,564 | B2 | 3/2009 | Yui |
| 9,016,847 | B1 | 4/2015 | Iijima et al. |
| 9,358,778 | B2 | 6/2016 | Gila et al. |
| 9,376,582 | B1 | 6/2016 | Dannhauser et al. |
| 9,588,464 | B2 | 3/2017 | Deprez et al. |
| 2003/0067528 | A1* | 4/2003 | Chowdry .................. B41J 2/04 347/103 |
| 2006/0170752 | A1 | 8/2006 | Kadomatsu et al. |
| 2007/0236535 | A1 | 10/2007 | Baker et al. |
| 2015/0070446 | A1 | 3/2015 | Taff et al. |
| 2015/0306869 | A1 | 10/2015 | Oron et al. |
| 2017/0232760 | A1 | 8/2017 | Nishitani et al. |
| 2019/0009549 | A1 | 1/2019 | Takada et al. |
| 2019/0009579 | A1* | 1/2019 | Inoue ........................ B41J 2/01 |

FOREIGN PATENT DOCUMENTS

| | | | |
|---|---|---|---|
| CN | 104854515 | A | 8/2015 |
| CN | 108136802 | A | 6/2018 |
| CN | 109203684 | A | 1/2019 |
| EP | 1442892 | A1 | 8/2004 |
| JP | 60-199693 | A | 10/1985 |
| JP | 2011-068070 | A | 4/2011 |

* cited by examiner

IMAGE FORMATION WITH ELECTROOSMOTIC LIQUID REMOVAL

BACKGROUND

Modern printing techniques involve a wide variety of media, whether rigid or flexible, and for a wide range of purposes. In some printing techniques, a liquid carrier may be used as part of depositing ink particles onto a substrate when forming an image.

DETAILED DESCRIPTION

Figure 1:
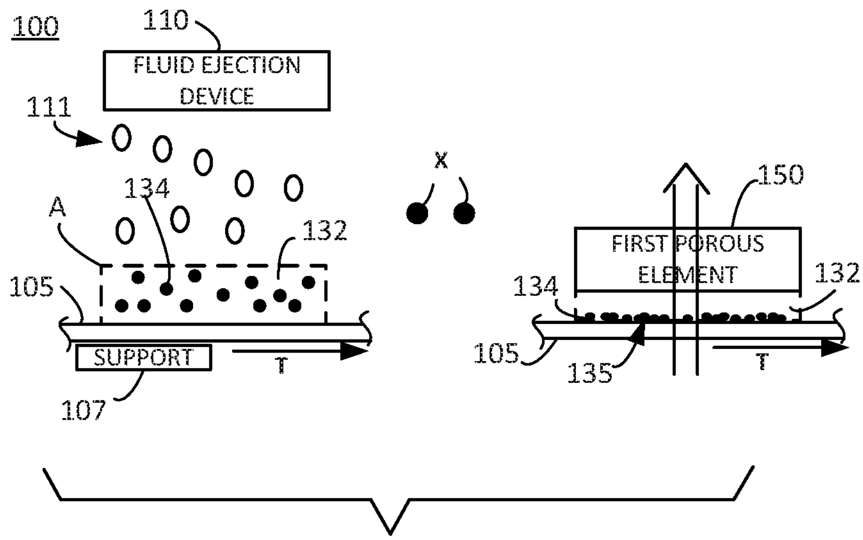
FIG. 1 is a diagram including side views schematically representing at least some aspects of an example image formation device.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense. It is to be understood that features of the various examples described herein may be combined, in part or whole, with each other, unless specifically noted otherwise.

In some examples, an image formation device comprises a fluid ejection device and a first porous element. The fluid ejection device is located along a travel path of a substrate to deposit droplets of ink particles within a liquid carrier onto the substrate to at least partially form an image on the substrate. The first porous element is located downstream along the travel path from the fluid ejection device to be in contact against the substrate to remove, via electroosmotic flow through the first porous element, at least a portion of the liquid carrier from the substrate. In some such examples, the support is to support movement of a substrate along a travel path. In some such examples, the area of contact between the first porous element and the substrate may sometimes be referred to as a first liquid removal zone or first contact zone.

In some examples, a second porous element may engage the first porous element at a location remote (e.g. separated from) the first contact zone at which the first porous element engages the substrate. The second porous element, via electroosmotic flow through both the first and second porous elements, removes liquid from the first porous element to dry the first porous element for further, later engagement with the substrate. In some such examples, the area of contact between the second porous element and the first porous element may sometimes be referred to as a second liquid removal zone or second contact zone. As noted above, the second liquid removal zone is located separate from (e.g. remote) the first liquid removal zone, such as the second liquid removal zone being downstream from the area of contact between the first porous element and the substrate.

In some examples, the liquid carrier may comprise an aqueous-based liquid carrier.

In some such examples, large volumes of the liquid carrier may be rapidly removed from the substrate (after image formation via ink particles) without costly heating or evaporation mechanisms as a primary means of removing such liquid. Moreover, in some examples the removal of liquid via engagement of the first porous element relative to the substrate may be implemented without mechanical elements (at the site of engagement) such as blades, squeegee rollers, while still achieving desirable speed and/or volume of liquid removal of aqueous-based liquids from the substrate.

These examples, and additional examples, are further described below in association with at least FIGS. 1-20.

FIG. 1 is a diagram including side views schematically representing at least some aspects of an example image formation device 100. As shown in FIG. 1, a support 107 supports a substrate 105 for movement along a travel path T. The support 107 may take various forms such as, but not limited to, a rotatable drum or a plurality of rollers, as later described in association with at least FIG. 5 and FIG. 6, respectively.

As further shown in FIG. 1, in some examples the image formation device 100 comprises a fluid ejection device 110 and a first porous element 150. The fluid ejection device 110 is located along the travel path T to deposit droplets 111 of ink particles 134 within a liquid carrier 132 onto the substrate 105 to at least partially form an image on the substrate 105, as represented within dashed box A.

In some examples, the first porous element 150 is located downstream along the travel path T from the fluid ejection device 110. As shown in FIG. 1, among other features the first porous element 150 is in contact against the substrate 105 to remove, via electroosmosis flow through the first porous element 150, at least a portion of the liquid carrier 132 from the substrate 105.

In some such examples, the contact between the first porous element 150 and the substrate 105 may comprise moving contact, such as rolling contact between the belt 152 and the substrate 105. However, in some examples, the moving contact may comprise sliding contact.

In some examples, the first porous element 150 may be considered to be part of a, and/or sometimes referred to as, a liquid removal arrangement.

In some examples, the fluid ejection device 110 comprises a drop-on-demand fluid ejection device. In some examples, the drop-on-demand fluid ejection device comprises an inkjet printhead. In some examples, the inkjet printhead comprises a piezoelectric inkjet printhead. In some examples, the fluid ejection device 110 may comprise other types of inkjet printheads. In some examples, the inkjet may comprise a thermal inkjet printhead. In some examples, the droplets may sometimes be referred to as being jetted onto the media. With this in mind, at least some of the aspects and/or implementations of image formation according to at least some examples of the present disclosure may sometimes be referred to as "jet-on-media", "jet-on-substrate", "jet-on-blanket", "offjet printing", and the like.

In some examples, the liquid carrier 132 may also comprise certain additives to increase a conductivity of the ink mixture deposited as droplets 11 from the fluid ejection device 110. In some examples, such increased conductivity may in turn enhance electroosmotic flow of liquid (e.g. liquid carrier 132) to remove liquid from the substrate 105 and/or from the first porous element (via a second porous element per later examples). In some such examples, the conductive additives may comprise solutions of buffers, such as phosphate buffer, borate buffer, or other electrolytes based on lithium, sodium, potassium, calcium, magnesium, chloride, perchlorate, phosphate, carbonate, sulphate, nitrate.

It will be understood that in some examples, the fluid ejection device 110 may comprise a permanent component of image formation device 100, which is sold, shipped, and/or supplied, etc. as part of image formation device 100. It will be understood that such "permanent" components may be removed for repair, upgrade, etc. as appropriate. However, in some examples, fluid ejection device 110 may be removably received, such as in instances when fluid ejection device 110 may comprise a consumable, be separately sold, etc.

In some examples, the liquid carrier 132 may comprise an aqueous liquid carrier.

Figure 10:
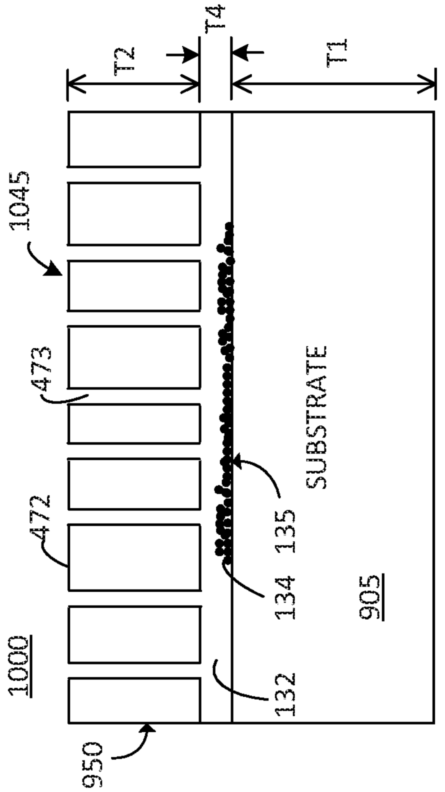
FIGS. 9, 10, and 11 are each a diagram including a sectional side view schematically representing an example first porous element and substrate of an example image formation device.
Figure 11:
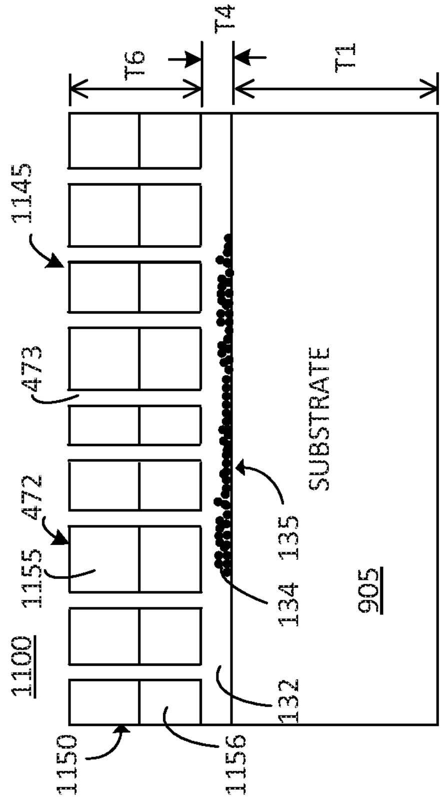

However, in some examples, the liquid carrier 132 may comprise a non-aqueous liquid carrier, such as in the example image formation devices described in association with at least FIGS. 10-11. In some such examples, when non-aqueous dielectric inks are used, and when electrostatic fixation (i.e. pinning) of ink particles 134 is implemented as shown in FIGS. 10 and 11, an electrically conductive element separate from the substrate 105 is provided to contact the substrate 105 in order to implement grounding of the substrate 105.

In some examples, substrate 105 comprises a metallized layer or foil.

However, in some examples, the substrate 105 is not metallized and comprises no conductive layer.

In some examples, the substrate 105 comprises a non-absorbing material, non-absorbing coating, and/or non-absorbing properties. Accordingly, in some examples the substrate 105 is made of a material which hinders or prevents absorption of liquids, such as a liquid carrier 132 and/or other liquids in the droplets received on the medium. In one aspect, in some such examples the non-absorbing medium does not permit the liquids to penetrate, or does not permit significant penetration of the liquids, into the surface of the non-absorbing medium.

The non-absorbing example implementations of the substrate 105 stands in sharp contrast to some forms of media, such as paper, which may absorb liquid. The non-absorbing attributes of the substrate 105 may facilitate drying of the ink particles on the media at least because later removal of liquid from the media will not involve the time and expense of attempting to pull liquid out of the media (as occurs with absorbing media) and/or the time, space, and expense of providing heated air for extended periods of time to dry liquid in an absorptive media.

Via the above-described example arrangements in which a first porous element is used to remove a liquid carrier from a substrate, the example device and/or associated methods can print images on a non-absorbing medium (or some other medium) with minimal bleeding, dot smearing, etc. while permitting high quality color on color printing. Moreover, via these examples employing electroosmotic flow-based liquid removal, image formation on a non-absorbing medium (or some other medium) can be performed with less time, less space, and less energy at least due to a significant reduction in drying time and capacity. These example arrangements stand in sharp contrast to other printing techniques (those lacking such electroosmotic flow-based liquid removal), such as high coverage, aqueous-based inkjet printing utilizing roller-to-roller nip based liquid removal (or similar mechanical elements) which may not adequately remove the liquid unless higher cost, lengthy drying is applied.

In some such examples, the non-absorptive substrate 105 may comprise other attributes, such as acting as a protective layer for items packaged within the media. Such items may comprise food or other sensitive items for which protection from moisture, light, air, etc. may be desired.

With this in mind, in some examples the substrate 105 may comprise a plastic media. In some examples, the substrate 105 may comprise polyethylene (PET) material, which may comprise a thickness on the order of about 10 microns. In some examples, the substrate 105 may comprise a biaxially oriented polypropylene (BOPP) material. In some examples, the substrate 105 may comprise a biaxially oriented polyethylene terephthalate (BOPET) polyester film, which may be sold under trade name Mylar in some instances. In some examples, the substrate 105 may comprise other types of materials which provide at least some of the features and attributes as described throughout the examples of the present disclosure. For examples, the substrate 105 or portions of substrate 105 may comprise a metallized foil or foil material, among other types of materials.

In some examples, substrate 105 comprises a flexible packaging material. In some such examples, the flexible packaging material may comprise a food packaging material, such as for forming a wrapper, bag, sheet, cover, etc. As previously mentioned for at least some examples, the flexible packaging materials may comprise a non-absorptive media.

In some examples, the image formation device may sometimes be referred to as a printer or printing device. In some examples in which a media is supplied in a roll-to-roll arrangement or similar arrangements, the image formation device may sometimes be referred to as a web press and/or the print medium can be referred to as a media web.

At least some examples of the present disclosure are directed to forming an image directly on a print medium, such as without an intermediate transfer member. Accordingly, in some instances, the image formation may sometimes be referred to as occurring directly on substrate 105, which may sometimes be referred to the print medium in such instances. However, this does not necessarily exclude some examples in which an additive layer may be placed on the print medium prior to receiving ink particles (within a carrier fluid) onto the print medium. In some instances, the print medium also may sometimes be referred to as a non-transfer medium to indicate that the medium itself does not comprise a transfer member (e.g. transfer blanket, transfer drum) by which an ink image is to be later transferred to another print medium (e.g. paper or other material). In this regard, the print medium may sometimes also be referred to as a final medium or a media product. In some such instances, the medium may sometimes be referred to as product packaging medium.

In some examples, the substrate 105 may sometimes be referred to as a non-transfer substrate, i.e. a substrate which does not act as a transfer member (e.g. a member by which ink is initially received and later transferred to a final substrate bearing an image). Rather, in some such examples, the substrate 105 may comprise a final print medium such that the printing or image formation may sometimes be referred as being direct printing because no intermediate transfer member is utilized as part of the printing process.

Figure 5:
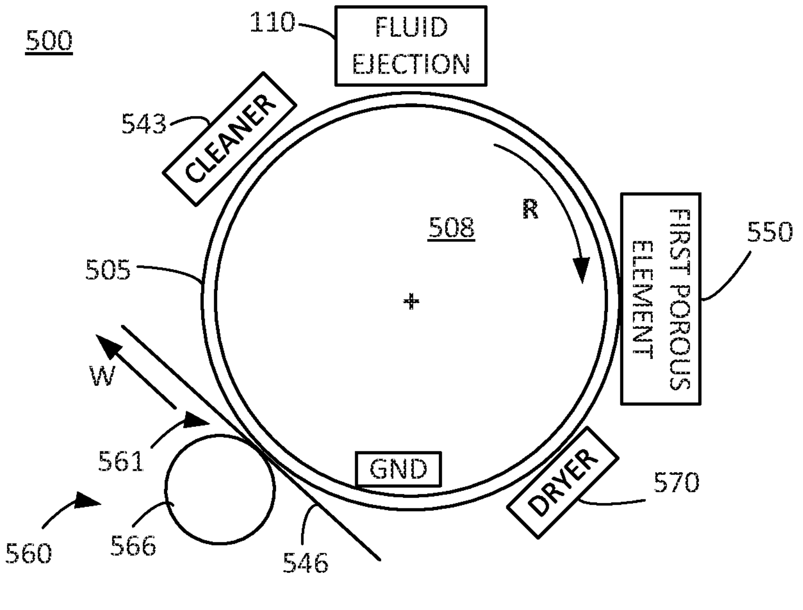
FIG. 5 is a diagram including a side view schematically representing an example image formation device including a rotatable drum-type substrate.
Figure 6:
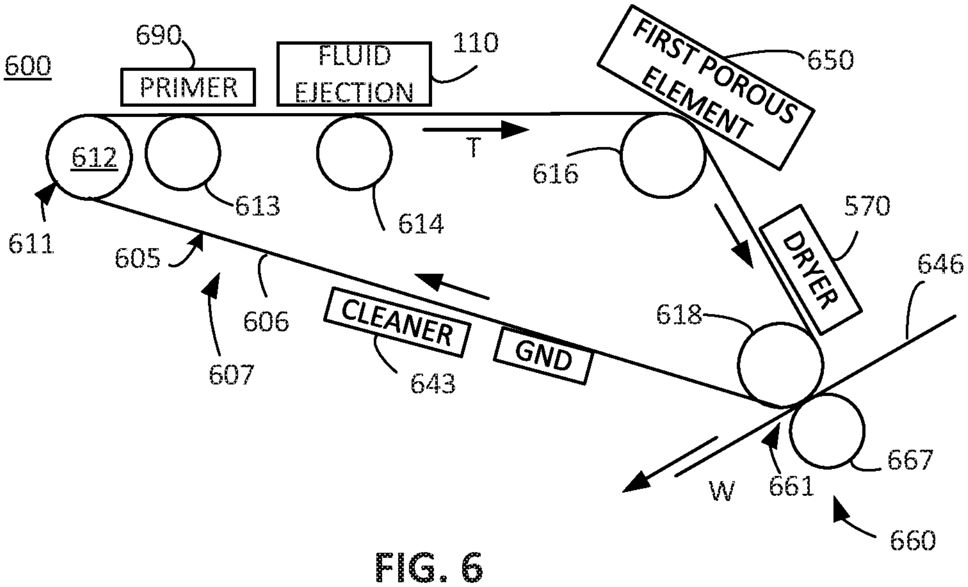
FIG. 6 is a diagram including a side view schematically representing an example image formation device including belt-type substrate.
Figure 18:
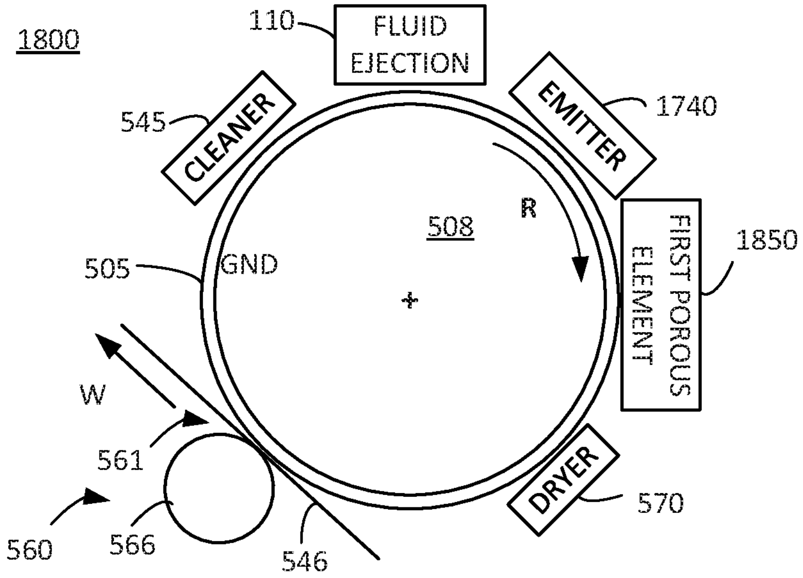
FIG. 18 is a diagram including a side view schematically representing an example image formation device including a rotatable drum-type substrate and a charge emitter for electrostatic fixation of ink particles.

In some examples, the substrate 105 comprises an intermediate transfer member, such as (but not limited to) the example image formation device 500 further described in association with at least FIGS. 5-6 and 18. In some instances, such an intermediate transfer member may be referred to as a blanket.

As shown in FIG. 1, in some examples, there are no features, elements, etc. (along the travel path T) located between the fluid ejection device 110 and the first porous element 150. However, as schematically represented by the black dots X, in some examples the image formation device 100 may comprise additional features, elements, etc. located along the travel path T between the fluid ejection device 110 and the first porous element 150. For instance, in some examples the image formation device 100 may comprise a charge emitter (e.g. located after the fluid ejection device 110) to emit electrostatic charges onto the deposited droplets 111 to cause electrostatic migration toward, and electrostatic fixation of, the ink particles 134 relative to the substrate, as further described in association with at least FIGS. 17-18.

Figure 2:
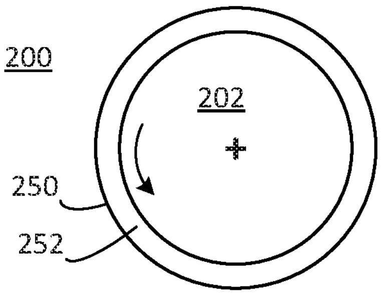
FIG. 2 is a diagram including a side view schematically representing an example first porous element in the form of an outer portion of a rotatable drum.

FIG. 2 is a diagram 200 including a side view schematically representing an example first porous element 250 in the form of an outer portion 252 of a rotatable drum 202. In some such examples, the first porous element 250 comprises at least some of substantially the same features and attributes as first porous element 150 in FIG. 1. Accordingly, in some examples, the outer portion 252 and/or rotatable drum 202 comprises a conductive material and/or a conductive member to facilitate the electroosmotic flow through the outer portion 252 (acting a first porous element) to remove liquid from a substrate, such as substrate 105 in FIG. 1. Further details regarding such an example first porous element 250, arranged as an outer portion 252 of a rotatable drum 202, are further described in association with at least FIG. 16. Moreover, in some examples, the configuration shown in FIG. 2 may be applicable to at least some aspects of a second porous element, which may comprise an outer portion of a rotatable drum, as further described later in association with at least FIGS. 12A and 14-16.

Figure 3:
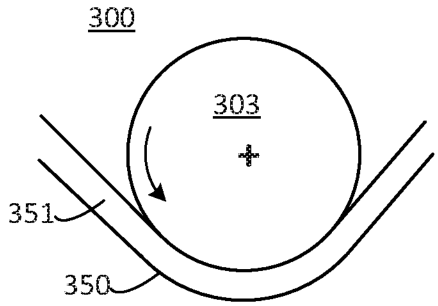
FIG. 3 is a diagram including a side view schematically representing an example first porous element in the form of a belt about a first roller.

FIG. 3 is a diagram 300 including a side view schematically representing an example first porous element 350 in the form of a belt 351 being supported by, and rotating about, a first roller 303. In some such examples, the first porous element 350 comprises at least some of substantially the same features and attributes as first porous element 150 in FIG. 1. Accordingly, in some examples, the first roller 303 comprises a conductive material and/or a conductive member to facilitate the electroosmotic flow through the belt 351 (acting as a first porous element) to remove liquid from a substrate, such as substrate 105 in FIG. 1. Further details regarding such example first porous elements 350, arranged as a belt 351, are further described in association with at least FIGS. 7-8 and 12A-15.

Figure 4A:
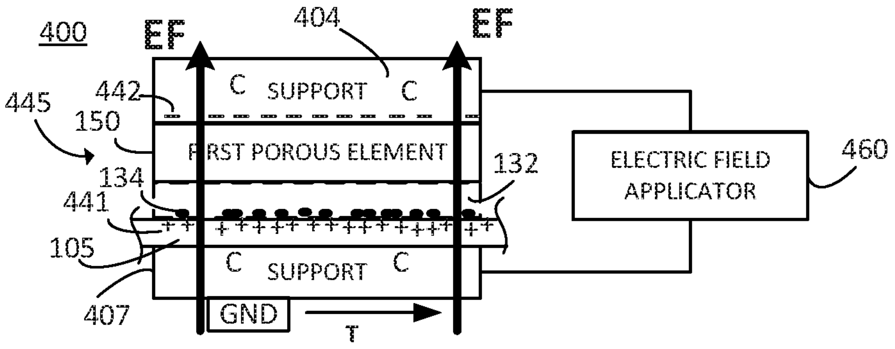
FIG. 4A is a diagram including a side view schematically representing an example liquid removal via electroosmotic flow of liquid through an example first porous element.

FIG. 4A is a diagram 400 including a side view schematically representing an example liquid removal arrangement 445 for removing liquid from a substrate via electroosmotic flow of liquid through an example first porous element 150. In some examples, the liquid removal arrangement 445 comprises at least some of substantially the features and attributes of, and/or comprises an example implementation of, the liquid removal arrangement of FIG. 1. As shown in FIG. 4A, the liquid removal arrangement 445 comprises a first porous element 150 in moving contact against a substrate 105 and an electric field (represented via arrows EF) being applied from the substrate 105 through the first porous element 150 to cause electroosmotic flow of liquid 132 through the first porous element 150 to remove liquid from the substrate 105 while not disturbing the deposited ink particles 134 on the substrate 105. It will be understood that the electric field is generally uniform along length of the first porous element 105 commensurate with a length of the substrate 105 in contact with the first porous element 150.

In particular, as shown in FIG. 4A, the first porous element 150 is supported by support 404, which may comprise a conductive material and/or a conductive member (as represented by identifier C). Support 404 may take the form of a roller (e.g. 303 in FIG. 3), a rotatable drum (e.g. 202 in FIG. 2), or other structure. Similarly, in some examples the substrate 105 is supported by support 407, which may comprise a conductive material and/or a conductive member (as represented by identifier C). Support 407 may take the form of a roller (e.g. 616 in FIG. 6), a rotatable drum (e.g. 508 in FIG. 5), or other structure.

In some examples, the support 407 and/or the substrate 105 may be grounded per a ground element (GND) which may form part of the support 407 and/or substrate 105 and/or which may be connected to the support 407 and/or substrate 105.

As further shown in FIG. 4A, the liquid removal arrangement 445 comprises an electric field applicator 460 by which the electric field (EF) may be established from support 407 (exhibiting positive charges 441), through substrate 105 and through first porous element 150, to support 404 (exhibiting negative charges 442). Further details regarding the electric field and/or electroosmotic flow are described in association with at least FIGS. 4B-4C.

Via this arrangement 445, electroosmotic flow will occur through the first porous element 150 to cause removal of liquid carrier 132 from substrate 105. It will be understood that in some examples the first porous element 150 comprises a structure and/or materials adapted to cause capillary flow of liquids through the first porous element 150 such that the application of the electric field causes electroosmotic flow (e.g. pumping action) to augment the capillary flow. In some such examples, the structure and/or the materials forming the first porous element 150 may induce or cause adsorption of liquids, such as a liquid carrier 132. Accordingly, in some instances, the first porous element 150 may sometimes be referred to as an adsorptive porous element. At least some of these details are described further below in association with at least FIGS. 4B-4C.

Figure 4B:
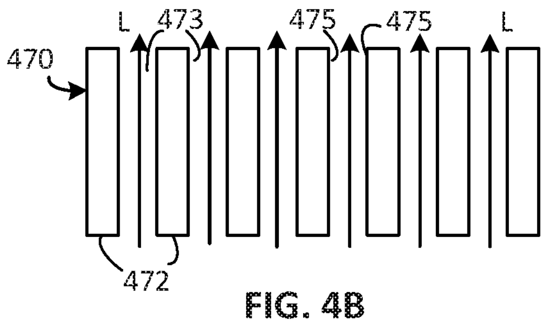
FIG. 4B is a diagram including a side view schematically representing an example first porous element including a plurality of channels.

FIG. 4B is a diagram including a side view schematically representing an example first porous element 470 including a plurality of channels 473. In some examples, the first porous element 470 comprises one example implementation of the first porous element 150, 250, 350 as previously described in association with FIGS. 1-4A and/or of later described example first porous elements and/or second porous elements. In general terms, the first porous element 470 may comprise a wide variety of materials and/or structures to induce a liquid to flow through the first porous element 470, whether via capillary flow and/or via other flow mechanisms, as represented via liquid flow arrows L. In at least some examples, the first porous element 470 may comprise and/or be modeled as a plurality of channels, such as but not limited to, the plurality of side-by-side channels 473 shown in FIG. 4B. Each channel 473 is defined between and by the side walls 475 of spaced apart, side-by-side elongate elements 472.

Figure 4C:
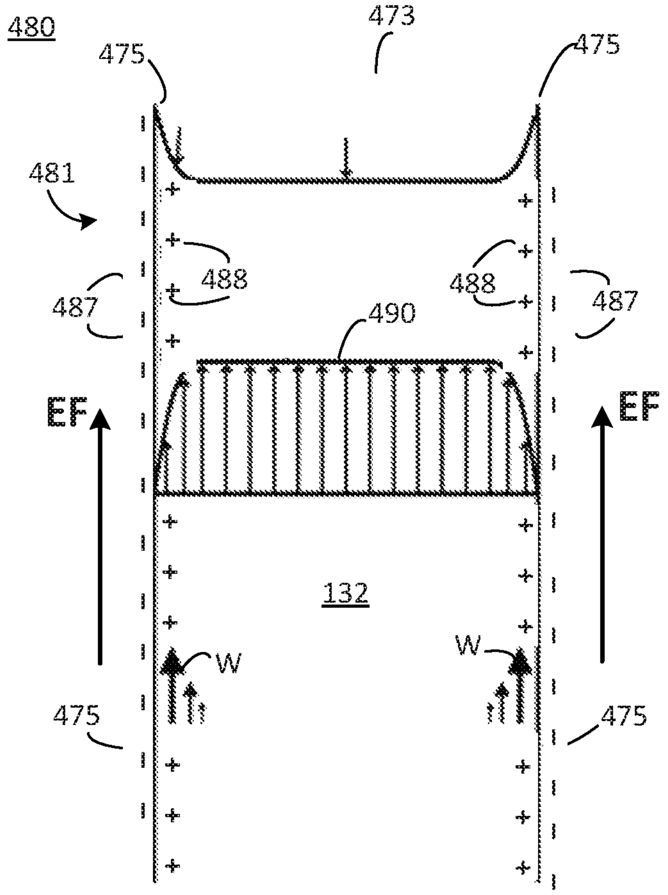
FIG. 4C is a diagram including a side view schematically representing an example electroosmotic flow of liquid through a channel of an example first porous element.

FIG. 4C is a diagram 480 including a side view schematically representing an example electroosmotic flow of liquid through an example channel 473 of an example first porous element. As shown in FIG. 4C, walls 475 of elements (472 in FIG. 4B) define a channel 473 through which liquid carrier 132 flows via electroosmotic pumping action. In general terms, electroosmotic flow arises because an electric charge arises at an interface of dissimilar materials, such as materials with a different chemical potential. This electric charge (e.g. negative charge 487 in FIG. 4C), in turn, attracts charge (e.g. positive charge 488) from the bulk of the liquid (e.g. liquid carrier 132 within channel 473), forming a double layer. When an electric field (e.g. EF as in FIG. 4A) is placed parallel to the pane of the interface, the mobile charge in the double layer moves as described by Coloumb's law. This moving charge drags the liquid (e.g. 132) along with it, first dragging the liquid near the wall (as represented by the largest arrow W), which then entrains the rest of the fluid in the channel as represented by the array 490 of arrows extending across a width of channel 473.

FIG. 5 is a diagram including a side view schematically representing an example image formation device 500. In some examples, the image formation device 500 comprises at least some of substantially the same features and attributes as the image formation device 100 in FIG. 1, with substrate 105 being implemented as a substrate 505 supported by a rotatable drum 508. In some instances, the substrate 505 may be referred to as an outer portion of rotatable drum 508. In a manner consistent with FIG. 1, the image formation device 500 comprises a fluid ejection device 110 and first porous element 550 arranged in series about an external surface of substrate 505 which rotates (as represented by arrow R). The rotating substrate 505 receives, via the fluid ejection device 110, deposited droplets 111 (of ink particles 134 within a liquid carrier 132) to at least partially form an intended image on the substrate 505. After such deposition, the first porous element 550 removes at least a portion of the liquid carrier from the substrate 505. In some such examples, it will be understood that at this point in the process of forming an image on the substrate, the first porous element 550 is not acting to remove ink residue from substrate 505 in the same manner as is to be performed later by cleaner unit 543 after formation of the image on the substrate 505 has been fully completed, such as after media transfer station 560.

In some examples, the first porous element 550 may comprise at least some of substantially the same features and attributes as the first porous element 150 (e.g. part of liquid removal arrangement 145) previously described in association with FIGS. 1-4A and/or those first porous elements (and associated liquid removal arrangements) later described in association with at least FIGS. 7-18.

As further shown in FIG. 5, in some examples image formation device 500 may comprise a dryer 570 downstream from the first porous element 550 to further remove liquid (including but not limited to liquid carrier 132) from the substrate 505.

As further shown in FIG. 5, the image formation device 500 may comprise a media transfer station 560, which may comprise an impression roller or cylinder 566 which forms a nip 561 with drum 508 to cause transfer of the formed image on substrate 505 of drum 508 to print medium 546 moving along path W.

As further shown in FIG. 5, in some examples the image formation device 500 may comprise a cleaner unit 543, which follows the media transfer station 560 and which precedes the fluid ejection device 110. The cleaner unit 543 is to remove any residual ink particles 132 and/or components of droplets 111 from the substrate 505 prior to operation of the fluid ejection device 110.

FIG. 6 is a diagram including a side view schematically representing an example image formation device 600. In some examples, the image formation device 600 comprises at least some of substantially the same features and attributes as the image formation device 100 in FIG. 1-4C, except with a substrate 605 being implemented as a belt 606 in a belt arrangement 607 (instead of a drum-type arrangement) among other differences noted below. As shown in FIG. 6, the substrate-belt arrangement 607 includes an array 611 of rollers 612, 614, 616, 618, with at least one of these respective rollers comprising a drive roller and the remaining rollers supporting and guiding the substrate 605. Via these rollers, the substrate 605 (as belt 606) continuously moves in travel path T to expose the substrate 605 to at least the fluid ejection device 110 and first porous element 650, in a manner consistent with the devices as previously described in association with at least FIGS. 1A-4C.

In some such examples, the belt 606 may sometimes be referred to as an endless belt because it forms a loop about a plurality of rollers in some examples, with the belt having no discrete end or beginning. In some examples, the belt 606 also may be referred to as rotating in an endless loop, i.e. a loop having no discrete end or beginning. It will be further understood that the scope of the terms "endless", "loop" and the like in association with the terms "belt" may be applicable with respect to other examples of the present disclosure in an appropriate context.

In a manner consistent with at least FIGS. 1-4C, the image formation device 600 comprises a fluid ejection device 110 and first porous element 650 arranged along the travel path T through which the substrate 605 moves so that the substrate 605 may receive, via the fluid ejection device 110, deposited droplets 111 (of ink particles 134 within a liquid carrier 132) to at least partially form an intended image on the substrate 605. After such deposition, first porous element 650 removes at least a portion of the liquid carrier 132 from the substrate 605. In some examples, the first porous element 650 may comprise at least some of substantially the same features and attributes as the first porous element 150 previously described in association with FIGS. 1A-4C and/or those first porous elements (and associated liquid removal arrangements) later described in association with at least FIGS. 7-18.

As further shown in FIG. 6, in some examples image formation device 600 may comprise a dryer 570 downstream from the first porous element 650 to further remove liquid (including but not limited to liquid carrier 132) from the substrate 605. As further shown in FIG. 6, in some examples the image formation device 600 may comprise a media transfer station 660, which may comprise an impression roller or cylinder 667 which forms a nip 661 with roller 618 to cause transfer of the formed image from substrate 605 at roller 618 onto print medium 646 moving along path W. As further shown in FIG. 6, in some examples the image formation device 600 may comprise a cleaner unit 643 which follows the media transfer arrangement 660 and which precedes at least the fluid ejection device 110. The cleaner unit 643 is to remove any residual ink particles 132 and/or components of droplets 111 from the substrate 605 prior to operation of the fluid ejection device 110.

As further shown in FIG. 6, in some examples the image formation device 600 comprises a primer unit 690 which precedes (i.e. is upstream from) the fluid ejection device 110 and which may deposit a primer layer or layer of binder material onto the substrate 605 and onto which the image may be formed, such as via operation of fluid ejection device 110, first porous element 650, dryer 270, etc. In some examples, this primer layer or binder layer may be transferred with the formed image onto the print medium 646.

In some examples, such a primer unit 690 may be implemented in the image formation device 500 of FIG. 5 with the primer unit 690 being located between the cleaner unit 543 and the fluid ejection device 110.

Figure 7:
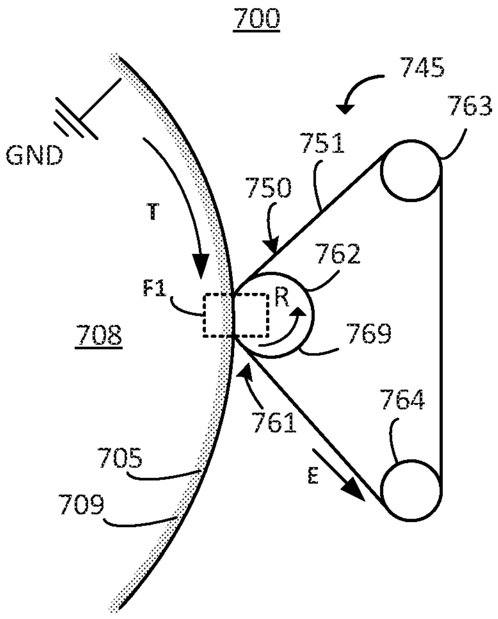
FIGS. 7-8 are each a diagram including a side view schematically representing an example liquid removal arrangement, including a first porous element.

FIG. 7 is a diagram including a side view schematically representing an example image formation device 700 including a first porous element 750 for removing from a substrate 705. In some examples, the example image formation device 700 comprises at least some of substantially the same features and attributes as the image formation devices, including a first porous element 150 and a substrate 105, as previously described in association with at least FIGS. 1-6. In some examples, the substrate 705 may take the form of a belt 606 as shown in FIG. 6 or may take the form of an outer portion 505 of a drum as shown in FIG. 5. In some examples, substrate 705 may comprise a non-transfer media, e.g. the final print medium onto which the image is to reside.

As further shown in FIG. 7, the first porous element 750 forms part of a liquid removal arrangement 745 in which the first porous element 750 comprises a belt 751 supported by, and rotating in an endless loop, about a plurality of rollers, such as rollers 762, 763, 764 with at least one of these rollers comprising a drive roller. Roller 762 is positioned to be in pressing contact against the substrate 705 at a nip 761 which defines a contact zone or first liquid removal zone F1, as shown via dashed lines in FIG. 7. Via the first porous element 750, liquid is removed from substrate 705 in the first liquid removal zone F1 in a manner consistent with that described in at least FIGS. 1-6 to remove liquid (e.g. liquid carrier 132) from the substrate 705.

Because the first porous element 750 in the form of a belt 751 rotates in a loop (as represented by directional arrow E), different portions of belt 751 will engage the substrate 105 as the belt 751 rotates. Similarly, at the same time that the belt 751 is rotating (directional arrow E) in a loop, the substrate 705 is moving along travel path T. As shown in FIG. 7, roller 762 rotates (arrow R) in a direction complementary with the travel path T of substrate 705. In some such examples, the belt 751 moves (rotates in the endless loop) at a speed which is substantially the same as the speed at which substrate 705 travels along the travel path T. In one aspect, this arrangement may minimize or eliminate shear forces, which might otherwise be present if the belt 752 and substrate 705 were moving at substantially different speeds.

In some examples, the support 708 comprises an outer portion 709 which is hard (e.g. not compressible) and the roller 762 comprises a relative soft, compressible outer portion 769. However, in some examples, the outer portion 709 of the support 708 comprises a relatively soft, compressible outer portion while the outer portion 769 of the roller 762 comprises a hard (e.g. not compressible) outer portion. In some examples, the substrate 705 may comprise a thickness on the order of 1 millimeter while the first porous element 750 (e.g. belt 751) may comprise a thickness of about 100 micro-meters, as further illustrated in the examples of FIGS. 9-11.

In some examples, a voltage applied to create the electric field to cause electroosmotic flow (through the first porous element 750) may comprise tens to hundreds of Volts, wherein the electric field may comprise about 10 to about 1000 Volts per millimeter. Meanwhile, in some such examples, the outer portion 769 of roller 762 may comprise a conductivity on the order of (or greater than) $10^6$ Ohms·cm, which may result in a response time of 1 milliseconds or less. Accordingly, in some examples, this response time of the outer portion 769 of roller 762 may be at least 10 times faster than the contact time of the outer portion 769 of roller 762 with the substrate in the nip 761.

Figure 8:
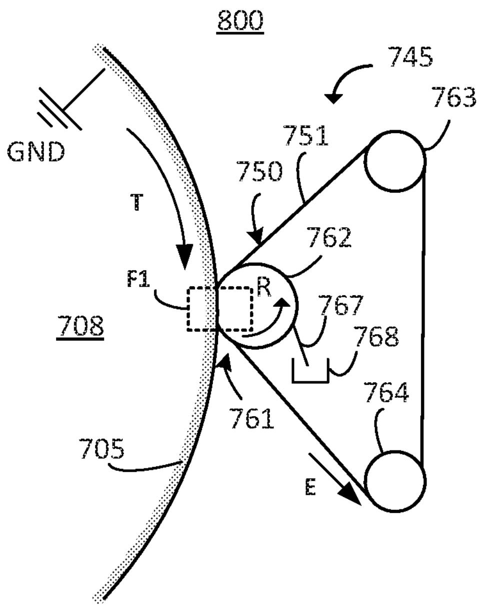

FIG. 8 is a diagram of an example image formation device 800 comprising at least some of substantially the same features and attributes as image formation device 700, except with the liquid removal arrangement 745 comprising additional elements to remove liquid from first roller 762. In some such examples, these additional elements may comprise a blade 767 to scrape liquid from the first roller 762 and a receptacle 768 to collect the liquid removed from the first roller 762. By employing these elements in a location remote from (e.g. other than directly against) the substrate 705, the liquid removal arrangement 745 may facilitate liquid removal without the encumbrances of such mechanical elements directly against the substrate 705, thereby allowing faster run times and less wear and tear on the substrate 705.

Figure 9:
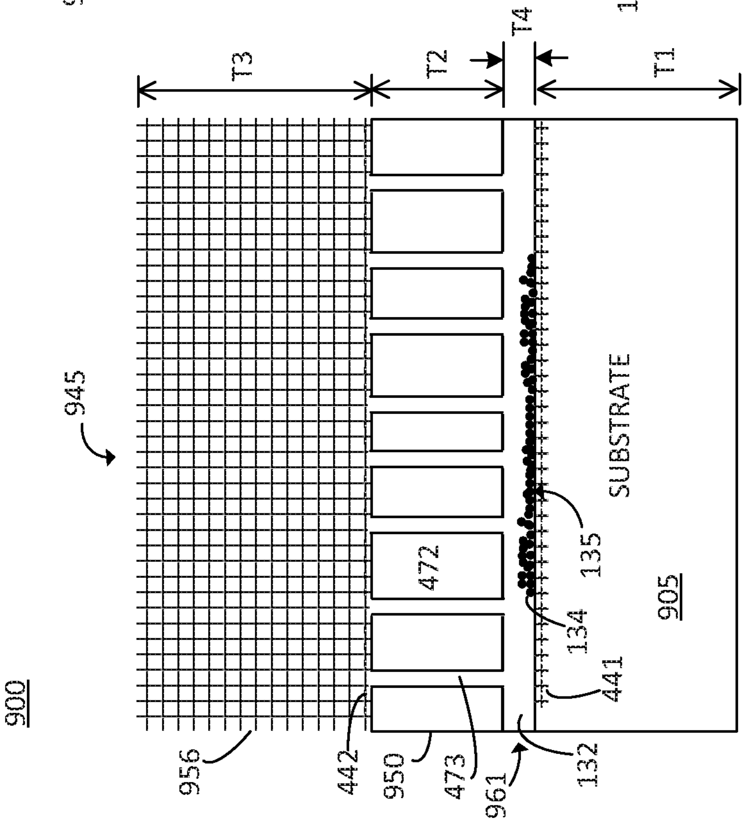

FIG. 9 is a diagram including a sectional side view schematically representing an example first porous element 950 of an example liquid removal arrangement 945 of an example image formation device. In some examples, the liquid removal arrangement 945 comprises at least some of substantially the same features and attributes as the liquid removal arrangements, as previously described in association with at least FIGS. 1-8. In some examples, the substrate 905 may take the form of a belt 606 as shown in FIG. 6, may take the form of an outer portion 505 of a drum as shown in FIG. 5, or make take other forms such as a final media on which the image will reside.

In particular, the liquid removal arrangement 945 comprises an arrangement substantially similar to that shown in FIG. 4A, except further depicting at least some aspects of the first porous element 150 (FIG. 4A) as first porous element 950 in FIG. 9 and further depicting support 404 (FIG. 4A) as support 956 in FIG. 9. As shown in FIG. 9, in some examples support 956 may comprise a conductive material and/or a conductive member, such as but not limited to, a conductive open cell foam. As noted in association with FIG. 4A, this support 956 may comprise an outer portion of a roller (e.g. roller 762 in FIG. 7) or an outer portion of a rotatable drum, such as in later described FIG. 16.

As further depicted in FIG. 9, the structure and/or materials forming the first porous element 950 may comprise and/or be modeled as, a plurality of channels 473 between side-by-side elements 472, like those shown in FIG. 4B.

In some examples, the first porous element 950 may comprise an insulative member with a desired conductivity provided via the support 956 for inducing electroosmotic flow. However, in some examples, the first porous element 950 may comprise an at least partially conductive member (or material). In some examples, the resistivity of the first porous element 950 may be on the order of (or greater than) $10^{10}$ Ohms·cm, assuming a contact area (between the substrate 905 and the first porous element 950) of about 3 to about 15 millimeters and a speed of 1 meter/second, which may achieve a response time of more than a few milliseconds. In some examples, this response time may be at least 10 times longer than the contact time of the first porous element 950 with the substrate 905 in a nip 961. In some examples, a longer contact area may be implemented, which may not necessarily be depicted in at least some of the examples of the present disclosure.

In some examples, the substrate 905 may comprise a thickness (T1) on the order of 1 millimeter while the first porous element 950 may comprise a thickness (T2) on the order of 100 micro-meter. Meanwhile, the conductive support 956 may comprise a thickness (T3) which is substantially greater than the thickness (T2) of the first porous element 950. FIG. 9 also depicts the ink particles 134 (at least partially forming an image) and liquid carrier 132 as having a thickness (T4), prior to removing the liquid, of about 10 micro-meter in their sandwiched position between the first porous element 950 and the substrate 905.

FIG. 10 is a diagram 1000 which provides a further illustration of a liquid removal arrangement 1045 (including first porous element 950) like liquid removal arrangement 945 in FIG. 9, except omitting the support 956. It will be understood that a support like support 956 or other support may provide backing to first porous element 950 for strength, conductivity, and/or other purposes, such as removing liquid from the first porous element 950 as in at least some of the later described examples, shown in FIGS. 12-16.

FIG. 11 is a diagram 1100 including a sectional side view schematically representing an example first porous element 1150 of a liquid removal arrangement 1145 and substrate 905 of an example image formation device.

In some examples, the liquid removal arrangement 1145 comprises at least some of substantially the same features and attributes as the liquid removal arrangements, as previously described in association with at least FIGS. 9-10, except with the first porous element 1150 comprising a double layer configuration including a first layer 1156 and a second layer 1155. Together, the respective layers 1156, 1155 define the same type of channels 473 between elements 472, as shown in FIGS. 4B, and 9-10. In some such examples, the first layer 1156 comprises a first conductivity and the second layer 1155 comprises a second conductivity which is greater than the first conductivity. In some examples, the second layer 1155 may comprise a support layer, which is less flexible, has greater strength, etc. than the first layer 1156. Together, the two layers 1156, 1155 may comprise an overall conductivity similar to that described in association with at least FIGS. 9-10.

FIGS. 12A and 13-16 are each a diagram including a side view schematically representing an example liquid removal arrangement including a first porous element to remove liquid from a substrate and a second porous element in contact with the first porous element to remove liquid from the first porous element.

Figure 12B:
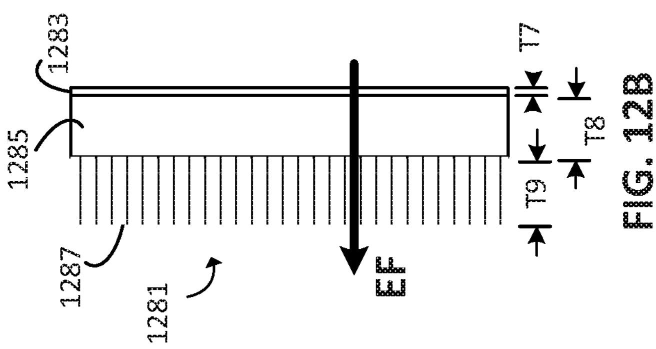
FIG. 12B is a diagram including a side view schematically representing a layered structure of an example first porous element.
Figure 12A:
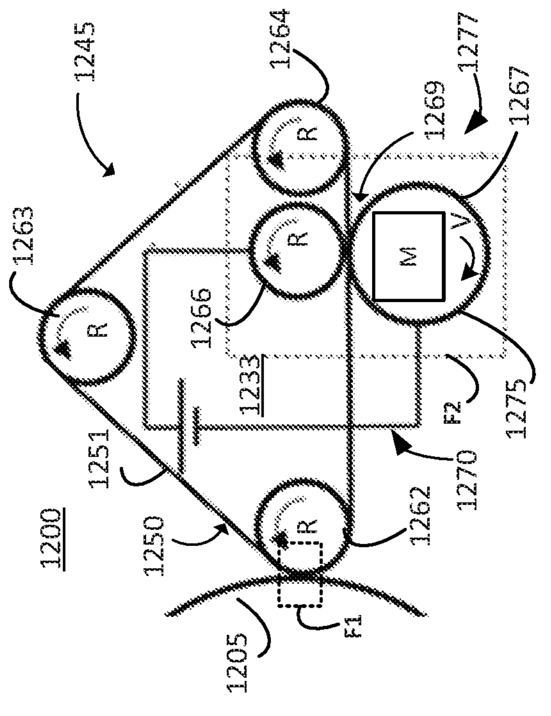
FIG. 12A is a diagram including a side view schematically representing an example liquid removal arrangement including a first porous element to remove liquid from a substrate and a second porous element in contact with the first porous element to remove liquid from the first porous element.

FIG. 12A is a diagram 1200 schematically representing an example liquid removal arrangement 1245. In some examples, the liquid removal arrangement 1245 comprises at least some of substantially the same features and attributes as, and/or an example implementation of, the liquid removal arrangement 150 (FIG. 1), 250 (FIG. 2), 350 (FIG. 3), 445 (FIG. 4A-4C), 550 (FIG. 5), 650 (FIG. 6), 745 (FIGS. 7-8), 945 (FIGS. 9-11). For instance, in a manner similar to that shown in FIGS. 7-8, the liquid removal arrangement 1245 comprises a plurality of rollers 1262, 1263, 1264 supporting the first porous element 1250 in the form of a belt 1251, with roller 1262 comprises substantially the same features as roller 762 in FIGS. 7-8.

As shown in FIG. 12A, each of the rollers 1262, 1263, 1264 (supporting belt 1251) rotate in a first direction (counterclockwise in this example as represented by arrow R), while the roller 1267 rotates in a second direction (clockwise as represented by arrow V).

In addition, liquid removal arrangement 1245 comprises additional elements to remove liquid from belt 1251 (of the first porous element 1250) to prepare (e.g. dry) portions of the belt 1251 prior to another pass in contact against substrate 1205 for primary liquid removal. In particular, as show in FIG. 12A, in some examples, the liquid removal arrangement 1245 comprises an additional roller 1266 further supporting belt 1251 and positioned between rollers 1262, 1264 in a location directly opposite a rotatable drum 1267 with belt 1251 passing between the roller 1266 and drum 1267 to form nip 1269. An outer portion 1275 of drum 1267 defines a second porous element, having at least some of substantially the same features and attributes as the first porous element 1250, except with the second porous element being applied in the second contact zone F2 whereas the first porous element (in the form of belt 251) acts to remove liquid from substrate 1205 in first liquid removal zone F1. In some instances, the first liquid removal zone F1 also may referred to as a first contact zone F1. In some examples, the second porous element in the form of an outer portion 1275 of drum 1267 may have a configuration like that described for outer portion 252 of drum 202 in association with FIG. 2.

Moreover, as further shown in FIG. 12A, the liquid removal arrangement 1245 may comprise an electric field applicator 1270 to apply an electric field (in a manner consistent as described in association with FIGS. 4A-4C) in a second liquid removal zone F2 to cause electroosmotic flow of liquid carrier 132 through belt 1251 (i.e. first porous element 1250) and through outer portion 1275 of drum 1267 (i.e. the second porous element) in order to remove the liquid carrier 132 from the belt 1251 (i.e. the first porous element 1250).

It will be further understood that the liquid captured via the outer portion 1275 (i.e. the second porous element) of drum 1267 is to be removed so that a given portion of the outer portion of drum 1267 may be "dried" enough so that upon its next pass through the nip 1269, the given portion of the outer portion 1275 will be ready and able to remove liquid from the belt 1251 (i.e. first porous element) in second contact zone F2 via electroosmotic flow.

With this in mind, in some examples the liquid removal arrangement 1245 may comprise a mechanical liquid removal element M to collect the liquid which was removed from belt 1251 (e.g. the first porous element) via operation of electroosmotic flow in the second liquid removal zone F2 via the outer portion 1275 (e.g. second porous element). This mechanical liquid removal element M may comprise a wide variety of elements, locations, etc., at least some of which are further described later below in association with at least FIG. 13.

Together, the roller 1266, drum 1267, electric field applicator 1270, and mechanical liquid removal arrangement M may be viewed as, or referred to as, a second liquid removal arrangement 1277, which forms part of and/or is associated with the primary liquid removal arrangement 1245.

FIG. 12B is a diagram including a side view schematically representing one example belt 1281, which comprises one example implementation of the first porous element 1250 in the form of the belt 1251. In some examples, the example belt 1281 may comprise an example implementation of one of the belts (as a first porous element) as previously described in association with at least FIGS. 1-12A for use in removing liquid in a first liquid removal zone F1.

As shown in FIG. 12B, in some examples, belt 1281 may comprise multiple layers, such as but not limited to layers 1283, 1285, 1287. In some examples, the first layer 1283 comprises an adhesion prevention layer 1283, which may comprise a hydrophobic material, and which may have a thickness (T7) on the order of 10 microns. In some examples, the second layer 1285 may comprise a porous media layer for liquid adsorption, and which may have a thickness (T8) on the order of 100 to 1000 microns. In some examples, the third layer 1287 may comprise a support layer, and which may have a thickness (T9), which may in some examples be greater than the thickness T8 of second layer 1285. In some examples, the third layer 1287 may comprise a flexible woven material, which may comprise a metal or a polymer with some conductivity. In some examples, the third layer 1287 may comprise pores to permit liquid to flow through layer 1287 after it passes through layers 1283, 1285 during liquid removal from the substrate. In some such examples, the pores may have an average diameter of on the order of 100 microns.

In some examples, the first layer 1283 is to engage the substrate 1205 while the third layer 1287 is to be in electrical communication with a power supply, e.g. electric field applicator, to apply the electric field (EF) to induce electroosmotic flow as described throughout examples of the present disclosure. The second layer 1285 sandwiched between layers 1283, 1287 acts to induce flow, such as capillary flow, aided by electroosmotic flow in the same direction indicated by arrow EF.

In some examples, a structure like that shown in FIG. 12B may be implemented as an outer portion of a drum (e.g. outer portion 1275 of drum 1267 in FIG. 12A) to function as a second porous element, which removes liquid from a first porous element such as belt 1251 in FIG. 12A via electroosmotic flow in a second liquid removal zone F2.

Figure 13:
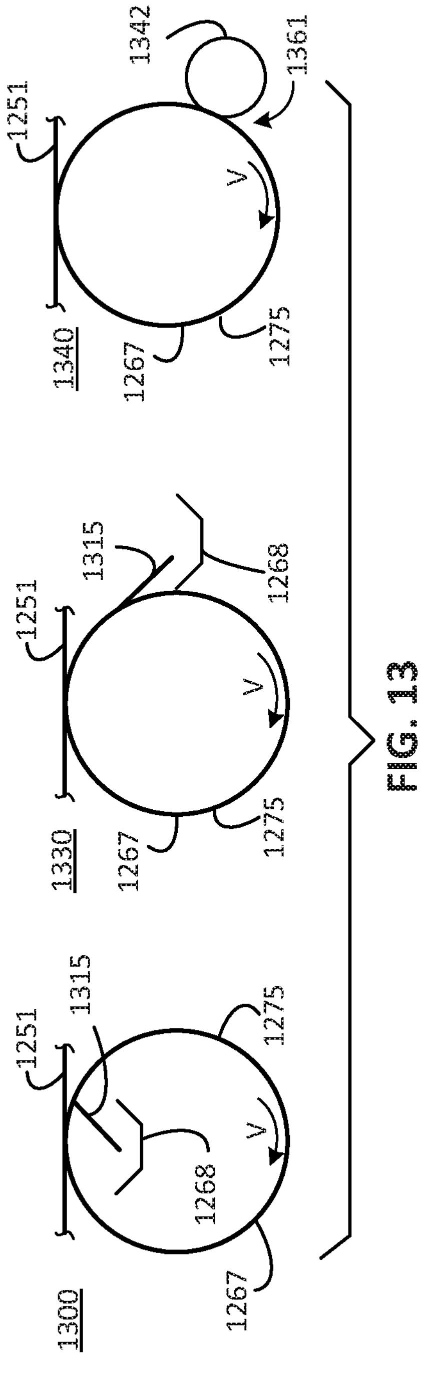
FIG. 13 is a diagram including a side view schematically representing different mechanical elements for liquid removal.

FIG. 13 is a diagram including a side view schematically representing different mechanical elements for removing liquid from an outer portion of a drum or other structure acting as, or including, a second porous element. In some examples, the various mechanical elements shown in FIG. 13 comprise at least some example implementations of the mechanical liquid removal element M shown in FIG. 12A, and later shown in FIGS. 14-16.

As shown in FIG. 13, in some examples the mechanical liquid removal element M may be implemented as example configuration 1300 in which a blade 1315 is positioned within an interior of drum 1267 to scrape the liquid (which was previously removed from the first porous element 1250 as belt 1251) from an inner surface of the outer portion 1275 of drum 1267 for collection into receptacle 1268. It will be further understood that, in some examples, the blade 1315 can be omitted with the outer portion 1275 (i.e. second porous element) of drum 1267 being structured to enable the liquid, under electroosmotic pumping action, to flow directly into the receptacle 1268 without the blade 1315.

As further shown in FIG. 13, in some examples the mechanical liquid removal element M may be implemented as example configuration 1330 in which the blade 1315 is positioned on an exterior of drum 1267 to scrape the liquid (which was previously removed from the first porous element 1250 as belt 1251) from an exterior surface of the outer portion 1275 of drum 1267 for collection into receptacle 1268.

As further shown in FIG. 13, in some examples the mechanical liquid removal element M may be implemented as example configuration 1340 in which a squeegee roller 1342 is positioned on an exterior of drum 1267 to force the liquid (which was previously removed from the first porous element 1250 as belt 1251) from an exterior surface of the outer portion 1275 of drum 1267 for collection into a receptacle (like 1268) or other structure. The collected liquid may be recycled, re-used, or discarded.

It will be understood that the various mechanical elements, such as blade 1315, squeegee roller 1342, receptacle 1268, and the like, may be applied in a variety of other locations, combinations, etc. relative to an outer portion 1275 of a drum 1267 in order to remove the liquid in a desired manner.

It will be further understood that, in viewing FIG. 12A and FIGS. 14-16, the location of the mechanical liquid removal element M is merely representative and that the mechanical liquid removal element is not strictly limited to a location within an interior of a drum (e.g. 1267 in FIGS. 12A, 1566 in FIGS. 15-16) but may have other locations (e.g. exterior) in proximity to such drums in order to implement the above-describe mechanical removal of liquid from the outer portion of such drums, rollers, etc. (which are acting as a second porous element for removing liquid from a first porous element, such as 1250).

Figure 14:
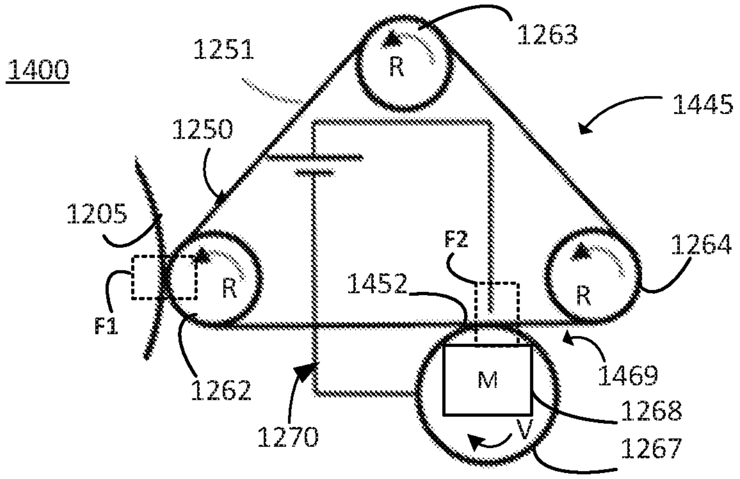
FIGS. 14-16 are each a diagram including a side view schematically representing an example liquid removal arrangement including a first porous element to remove liquid from a substrate and a second porous element in contact with the first porous element to remove liquid from the first porous element.

FIG. 14 is a diagram 1400 schematically representing an example liquid removal arrangement 1445. In some examples, the liquid removal arrangement 1545 comprises at least some of substantially the same features and attributes as the liquid removal arrangement 1245 in FIGS. 12A, 12B, 13, except for omitting the support roller 1266 so that drum 1267 (an outer portion 1275 of which acts as a second porous element) is contact with belt 1251 (acting as first porous element 1250) without a support roller directly opposite from the drum 1267 as in FIG. 12A.

Figure 15:
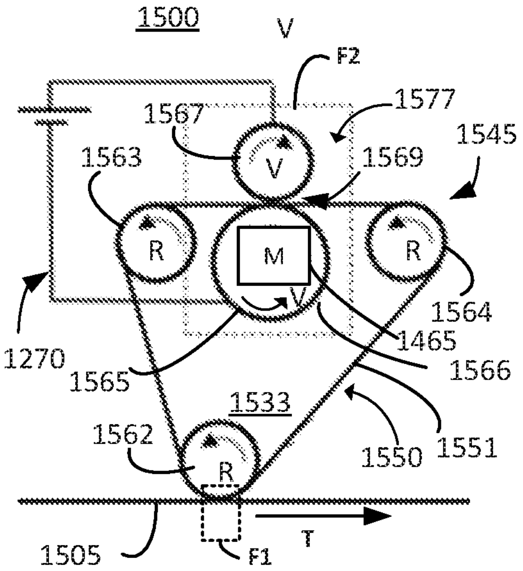

FIG. 15 is a diagram 1500 schematically representing an example liquid removal arrangement 1545. In some examples, the liquid removal arrangement 1445 comprises at least some of substantially the same features and attributes as the liquid removal arrangements described in association with at least FIGS. 12A-14 to remove liquid from a substrate via a first porous element 1250 (e.g. as belt 1251), and/or to remove liquid from a first porous element 1250 (e.g. as belt 1251) via a second porous element (embodied as outer portion 1275 of drum 1267). Like liquid removal arrangement 1245, the liquid removal arrangement 1545 in FIG. 15 comprises first porous element 1550 in the form of a belt 1551 supported by a plurality of rollers 1562, 1563, 1564 (like rollers 1262, 1263, 1264), with at least one such roller comprising a drive roller. In other respects, roller 1562 may comprise features like roller 1362.

FIG. 15 also illustrates that in some examples, the substrate 1505 may comprise a media, such as the final print medium, on which the formed image will reside. As such, in this example shown in FIG. 15, the substrate 1505 is not directly supported by a roller or drum at the point at which the first porous element 1550 (supported by roller 1562) engages the substrate 1505.

As further shown in FIG. 15, the liquid removal arrangement 1545 comprises a second liquid removal arrangement 1577 which comprises a rotatable drum 1566 disposed on one side of belt 1551 and a roller 1567 located on an opposite side of belt 1551, with rotatable drum 1566 within an interior 1533 of the belt 1551 and roller 1567 exterior of the loop defined by belt 1551. Roller 1567 directly supports belt 1551 at this point of contact, and together the roller 1567 and drum 1566 form a nip 1569 through which belt 1551 moves. At the nip 1569 at which second contact zone F2 is defined, liquid is removed from belt 1551 (e.g. a first porous element) via electroosmotic flow (caused by electric field applicator 1270) through belt 1151 and through an outer portion 1565 of rotatable drum 1566 (e.g. a second porous element), such as previously described in various examples, such as but not limited to FIG. 2. The liquid removed from belt 1551 and carried by outer portion 1565 is engaged via the mechanical liquid removal element M in a manner consistent with that described in association with at least FIGS. 12A-13.

As shown in FIG. 15, each of the rollers 1562, 1563, 1564 (supporting belt 1551) and the drum 1566 rotate in a first direction (counterclockwise in this example as represented by arrow R), while the roller 1567 rotates in a second direction (clockwise as represented by arrow V).

Figure 16:
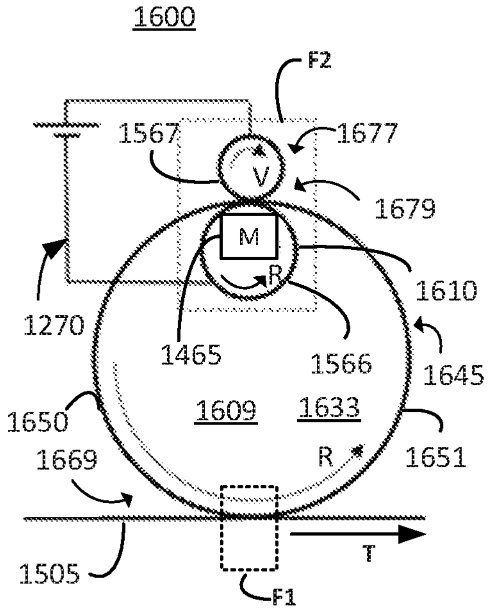

FIG. 16 is a diagram 1600 schematically representing an example liquid removal arrangement 1645. In some examples, the liquid removal arrangement 1645 comprises at least some of substantially the same features and attributes as the liquid removal arrangements described in association with at least FIGS. 12A-15 to remove liquid from a substrate via a first porous element, and/or to remove liquid from the first porous element via a second porous element. In some examples, the liquid removal arrangement 1645 comprises a first porous element 1650 in the form of an outer portion 1610 of a rotatable drum 1609, which comprises one example implementation of the arrangement in FIG. 2 in which the first porous element 250 takes the form of an outer portion 252 of a rotatable drum 202.

Accordingly, as shown in FIG. 16, the drum 1609 is in rolling contact (arrow R) against the substrate 1505 (which moves along travel path T) at nip 1669, at which electroosmotic flow causes removal of liquid (e.g. liquid carrier 132) from substrate 1505 via the outer portion 1651 (a first porous element) of drum 1609 in contact zone F1. Such removed liquid is carried within the outer portion 1651 of drum 1609 as drum 1609 rotates (arrow R) until a given portion of outer portion 1651 (the first porous element) enters nip 1679 as shown in FIG. 16, with nip 1679 forming part of a second liquid removal arrangement 1677. In some examples, this arrangement 1677 may comprise a rotatable drum 1566 located within an interior of drum 1609 and a roller 1567 in rolling contact with outer portion 1651 of rotatable drum 1609. Drum 1566 rotates in the same direction as, but relative to drum 1609 with an exterior surface of outer portion 1610 (a second porous element) of drum 1566 in rolling contact against an inner wall of an outer portion 1610 of drum 1609. In some instances, the drum 1566 may be referred to as being nested within an interior of drum 1609.

In a manner similar to that described for FIG. 12A, via application of an electric field via applicator 1270, electroosmotic flow in the contact zone F2 causes liquid to be removed from outer portion 1651 of drum 1609 as liquid flows through outer portion 1651 (a first porous element) of drum 1609, and through outer portion 1610 (a second porous element) of rotatable drum 1609, with the removed liquid being further removed, collected, etc. via the mechanical liquid removal element M.

Figure 17:
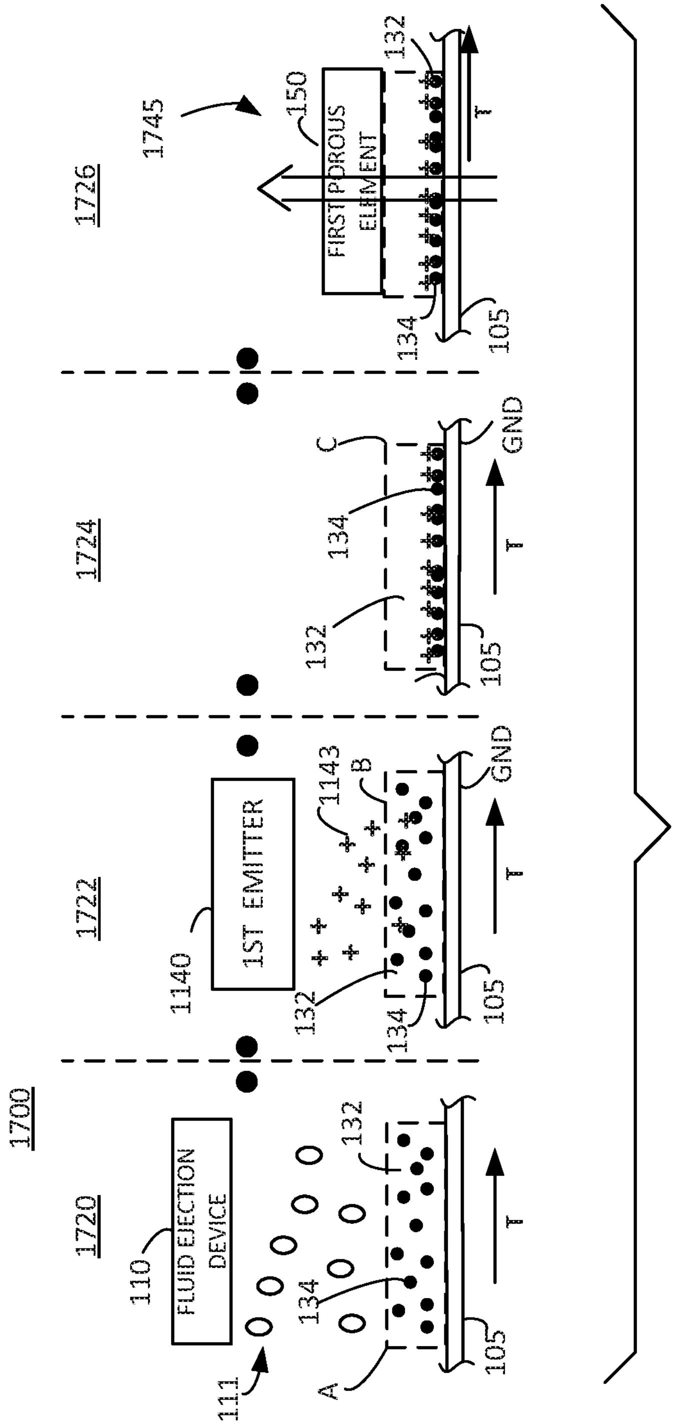
FIG. 17 is a diagram including side views schematically representing at least some aspects of an example image formation device, including a first porous element for liquid removal from a substrate.

FIG. 17 is a diagram schematically representing an example image formation device 1700. In some examples, the image formation device 1700 comprises an example image formation device comprising at least some of substantially the same features and attributes as, and/or an example implementation of, the liquid removal arrangement 150 (FIG. 1), 250 (FIG. 2), 350 (FIG. 3), 445 (FIG. 4A-4C), 550 (FIG. 5), 650 (FIG. 6), 745 (FIGS. 7-8), 945 (FIGS. 9-11), 1245 (FIGS. 12-13), 1445 (FIG. 14), 1550 (FIG. 15), 1650 (FIG. 16).

The image formation device 1700 comprises at least some of substantially the same features and attributes as the image formation devices described in association with at least FIGS. 1-4C, 5, and 6. Moreover, as shown in FIG. 17, in some examples, downstream from the fluid ejection device 110, the image formation device 1700 may comprise a charge emitter 1140 to emit charges onto deposited droplets 111 (of ink particles 134 within a liquid carrier 132) to cause electrostatic migration of the ink particles 134 through the liquid carrier 132 toward the substrate 105 as shown in portion 1722 of FIG. 17, and to cause electrostatic fixation of the ink particles 134 against the substrate 105, as shown in portion 1724 of FIG. 17. In some examples, the liquid carrier 132 may comprise a non-aqueous fluid, which in some examples may comprise a low viscosity, dielectric oil, such as an isoparaffinic fluid. Some versions of such dielectric oil may be sold under the trade name Isopar®. Among other attributes, the non-aqueous liquid carrier may be more easily removed from the substrate 105 (than an aqueous liquid carrier), at least to the extent that the substrate 105 may comprise some aqueous absorptive properties. In some examples, the non-aqueous fluid may comprise charge directors and/or dispersants to implement low field conductivity, which may facilitate removal of the liquid carrier 132 in its non-aqueous form from the substrate 105.

As further shown in dashed box B of portion 1722 of FIG. 17, the deposited charges 1143 become attached to the deposited ink particles 134, which then migrate to substrate 105 due to the electrostatic forces of the charges 1143 being attracted to the grounded substrate 105. Moreover, as shown in dashed box C in portion 1724 of FIG. 17, upon all of the deposited ink particles 134 (with attached charges 1143) becoming electrostatically fixed relative to the substrate 105, the liquid carrier 132 exhibits a supernatant relationship relative to the ink particles 134, which are electrostatically fixed against the substrate 105. With the liquid carrier 132 in this arrangement, the liquid carrier 132 can be readily removed from the substrate 105 without disturbing (or without substantially disturbing) the electrostatically fixed ink particles 134 in their desired, targeted position on the substrate 105 by which an image is at least partially formed. With this in mind, the liquid removal arrangement 1745 acts to remove the liquid carrier 132 from the substrate 105 in a manner consistent with the previously described examples of a liquid removal arrangement, such as but not limited to liquid removal arrangement 150 (FIG. 1), 250 (FIG. 2), 350 (FIG. 3), 445 (FIG. 4A-4C), 550 (FIG. 5), 650 (FIG. 6), 745 (FIGS. 7-8), 945 (FIGS. 9-11), 1245 (FIGS. 12-13), 1445 (FIG. 14), 1550 (FIG. 15), 1650 (FIG. 16).

With further reference to FIG. 17, the charge emitter 1140 may comprise a corona, plasma element, or other charge generating element to generate a flow of charges. The charge emitter 1140 may sometimes be referred to as a charge source, charge generation device, and the like. The generated charges may be negative or positive as desired. In some examples, the charge emitter 1140 comprises an ion head to produce a flow of ions as the charges. It will be understood that the term "charges" and the term "ions" may be used interchangeably to the extent that the respective "charges" or "ions" embody a negative charge or positive charge (as determined by emitter 1140).

In the particular instance shown in FIG. 17, the emitted charges 1143 can become attached to the ink particles 134 to cause all of the charged ink particles to have a particular polarity, which will be attracted to ground. In some such examples, all or substantially all of the charged ink particles 134 will have a negative charge or alternatively all or substantially all of the charged ink particles 134 will have a positive charge.

FIG. 18 is a diagram including a side view schematically representing an example image formation device 1800, which comprises at least one example implementation of the image formation device 1700 of FIG. 17. In some examples, the image formation device 1800 comprises at least some of substantially the same features and attributes as image formation device 500 in FIG. 5, while further comprising a charge emitter 1140 located along the travel path T of substrate 505 (on rotatable drum 508) between the fluid ejection device 110 and the first porous element 1850. In a manner similar to that represented in FIG. 17, the charge emitter 1140 emits charges (e.g. 1143 in FIG. 17) to cause electrostatic migration of the ink particles 134 through the liquid carrier 132, and electrostatic fixation of, ink particles 134 relative to substrate 505 in manner described in association with FIG. 17. As in the example of FIG. 17, the liquid carrier 132 may be a non-aqueous fluid.

Figure 19A:
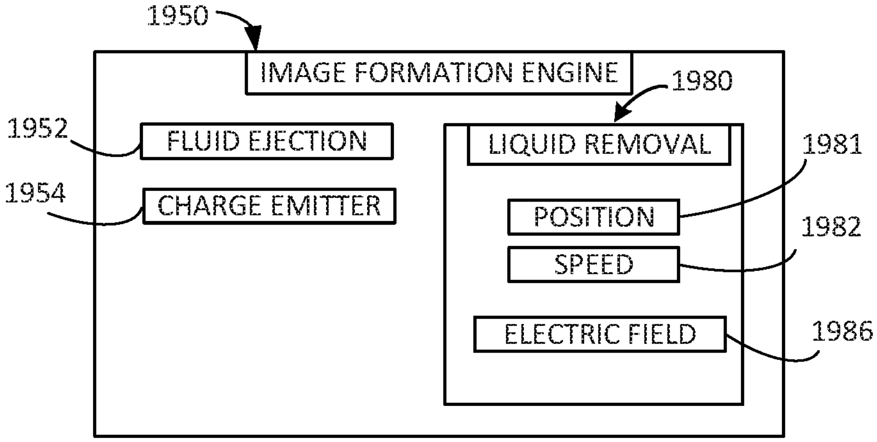
FIG. 19A is a block diagram schematically representing an example image formation engine.

FIG. 19A is a block diagram schematically representing an example image formation engine 1950. In some examples, the image formation engine 1950 may form part of a control portion 2100, as later described in association with at least FIG. 19B, such as but not limited to comprising at least part of the instructions 2111. In some examples, the image formation engine 1950 may be used to implement at least some of the various example devices and/or example methods of the present disclosure as previously described in association with FIGS. 1-18 and/or as later described in association with FIGS. 19B-20. In some examples, the image formation engine 1950 (FIG. 19A) and/or control portion 2100 (FIG. 19B) may form part of, and/or be in communication with, an image formation device.

In general terms, the image formation engine 1950 is to control at least some aspects of operation of the image formation devices and/or methods as described in association with at least FIGS. 1-18 and 19B-20.

As shown in FIG. 19A, the image formation engine 1950 may comprise a fluid ejection engine 1952, a charge emitter engine 1954, and/or a liquid removal engine 1980.

In some examples, the fluid ejection engine 1952 controls operation of the fluid ejection device 110 (e.g. at least FIG. 1) to deposit droplets of ink particles 134 within a liquid carrier 132 onto a substrate 105 (e.g. at least FIG. 1) as described throughout the examples of the present disclosure.

In some examples, the charge emitter engine 1954 is to control operation of a charge emitter (e.g. 1140 in FIGS. 17, 18) to emit airborne electrical charges to induce electrostatic migration of ink particles 134 toward the substrate 105 and electrostatic fixation of the migrated ink particles 134 at their target locations in a pattern at least partially forming an image, such as described in association with FIGS. 17-18 and/or various examples throughout the present disclosure.

In some examples, in general terms the liquid removal engine 1980 controls operation of at least a liquid removal arrangement to remove the liquid carrier (e.g. 132 in FIG. 1) from a substrate (e.g. 105 in FIG. 1) and/or from a first porous element via a second porous element. Such control may comprise control of operation of at least the various elements, portions, aspects of the liquid removal throughout the examples of the present disclosure, such as but not limited to the examples of 150 (FIG. 1), 250 (FIG. 2), 350 (FIG. 3), 445 (FIG. 4A-4C), 550 (FIG. 5), 650 (FIG. 6), 745 (FIGS. 7-8), 945 (FIGS. 9-11), 1245 (FIGS. 12-13), 1445 (FIG. 14), 1550 (FIG. 15), 1650 (FIG. 16), 150 (FIG. 17), and/or 1850 (FIG. 18).

In some examples, the liquid removal engine 1980 comprises a position parameter 1981 to control a position of a first porous element (as a drum or belt), such as via controlling a position of a roller(s) and/or drum via which the first porous element is implemented. Similarly, in some examples the position parameter 1981 is to control a position of a second porous element (as a belt or drum) such as via controlling a position of a roller(s) and/or drum via which the second porous element is implemented.

In some examples, the liquid removal engine 1980 may comprise a speed parameter 1982 by which a speed of the belt or rotatable drum is controlled (and/or tracked) via operation of the support and/or drive rollers of one of the various example belt arrangements described in association with at least FIGS. 1A-18.

In some examples, the liquid removal engine 1980 may comprise an electric field parameter 1986 to control (and/or track) the electric field applied to cause electroosmotic flow to remove liquid from a substrate via a first porous element (e.g. as belt 1251 in FIG. 12A at first liquid removal zone F1, in one example) and/or to remove liquid from the first porous element (e.g. belt 1251) via a second porous element, such as outer portion 1275 of drum 1267 in FIG. 12A at second liquid removal zone F2, in one example.

It will be understood that, in at least some examples, the image formation engine 1950 is not strictly limited to the particular grouping of parameters, engines, functions, etc. as represented in FIG. 19A, such that the various parameters, engines, functions, etc. may operate according to different groupings than shown in FIG. 19A.

Figure 19B:
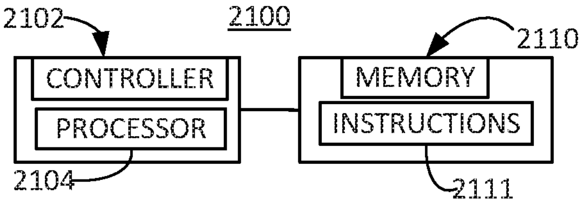
FIG. 19B is a block diagram schematically representing an example control portion.

FIG. 19B is a block diagram schematically representing an example control portion 2100. In some examples, control portion 2100 provides one example implementation of a control portion forming a part of, implementing, and/or generally managing the example image formation devices, as well as the particular portions, fluid ejection devices, charge emitters, porous elements, electric field applicators, liquid removal elements, elements, devices, user interface, instructions, engines, parameters, functions, and/or methods, as described throughout examples of the present disclosure in association with FIGS. 1-19A and 19C-20.

In some examples, control portion 2100 includes a controller 2102 and a memory 2110. In general terms, controller 2102 of control portion 2100 comprises at least one processor 2104 and associated memories. The controller 2102 is electrically couplable to, and in communication with, memory 2110 to generate control signals to direct operation of at least some the image formation devices, various portions and elements of the image formation devices, such as fluid ejection devices, charge emitters, porous elements, electric field applicators, liquid removal elements, user interfaces, instructions, engines, functions, and/or methods, as described throughout examples of the present disclosure. In some examples, these generated control signals include, but are not limited to, employing instructions 2111 stored in memory 2110 to at least direct and manage depositing droplets of ink particles and liquid carrier to form an image on a media, jetting droplets, directing charges onto ink particles, removing liquids (e.g. via porous elements, electric field applicators, etc.), etc. as described throughout the examples of the present disclosure in association with FIGS. 1-19A and 19C-20. In some instances, the controller 2102 or control portion 2100 may sometimes be referred to as being programmed to perform the above-identified actions, functions, etc. In some examples, at least some of the stored instructions 2111 are implemented as a, or may be referred to as, a print engine, an image formation engine, and the like, such as but not limited to the image formation engine 1950 in FIG. 19A.

In response to or based upon commands received via a user interface (e.g. user interface 2120 in FIG. 19C) and/or via machine readable instructions, controller 2102 generates control signals as described above in accordance with at least some of the examples of the present disclosure. In some examples, controller 2102 is embodied in a general purpose computing device while in some examples, controller 2102 is incorporated into or associated with at least some of the image formation devices, portions or elements along the travel path, fluid ejection devices, charge emitters, porous elements, electric field applicators, liquid removal elements, user interfaces, instructions, engines, functions, and/or methods, etc. as described throughout examples of the present disclosure.

For purposes of this application, in reference to the controller 2102, the term "processor" shall mean a presently developed or future developed processor (or processing resources) that executes machine readable instructions contained in a memory or that includes circuitry to perform computations. In some examples, execution of the machine readable instructions, such as those provided via memory 2110 of control portion 2100 cause the processor to perform the above-identified actions, such as operating controller 2102 to implement the formation of an image as generally described in (or consistent with) at least some examples of the present disclosure. The machine readable instructions may be loaded in a random access memory (RAM) for execution by the processor from their stored location in a read only memory (ROM), a mass storage device, or some other persistent storage (e.g., non-transitory tangible medium or non-volatile tangible medium), as represented by memory 2110. The machine readable instructions may include a sequence of instructions, a processor-executable machine learning model, or the like. In some examples, memory 2110 comprises a computer readable tangible medium providing non-volatile storage of the machine readable instructions executable by a process of controller 2102. In some examples, the computer readable tangible medium may sometimes be referred to as, and/or comprise at least a portion of, a computer program product. In other examples, hard wired circuitry may be used in place of or in combination with machine readable instructions to implement the functions described. For example, controller 2102 may be embodied as part of at least one application-specific integrated circuit (ASIC), at least one field-programmable gate array (FPGA), and/or the like. In at least some examples, the controller 2102 is not limited to any specific combination of hardware circuitry and machine readable instructions, nor limited to any particular source for the machine readable instructions executed by the controller 1402.

In some examples, control portion 2100 may be entirely implemented within or by a stand-alone device.

In some examples, the control portion 2100 may be partially implemented in one of the image formation devices and partially implemented in a computing resource separate from, and independent of, the image formation devices but in communication with the image formation devices. For instance, in some examples control portion 2100 may be implemented via a server accessible via the cloud and/or other network pathways. In some examples, the control portion 2100 may be distributed or apportioned among multiple devices or resources such as among a server, an image formation device, and/or a user interface.

Figure 19C:
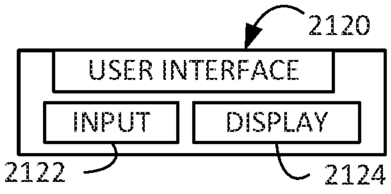
FIG. 19C is a block diagram schematically representing an example user interface.

In some examples, control portion 2100 includes, and/or is in communication with, a user interface 2120 as shown in FIG. 19C. In some examples, user interface 2120 comprises a user interface or other display that provides for the simultaneous display, activation, and/or operation of at least some of the image formation devices, portions thereof, elements, user interfaces, instructions, engines, functions, and/or methods, etc. as described in association with FIGS. 1-19B and 20. In some examples, at least some portions or aspects of the user interface 2120 are provided via a graphical user interface (GUI), and may comprise a display 2124 and input 2122.

Figure 20:
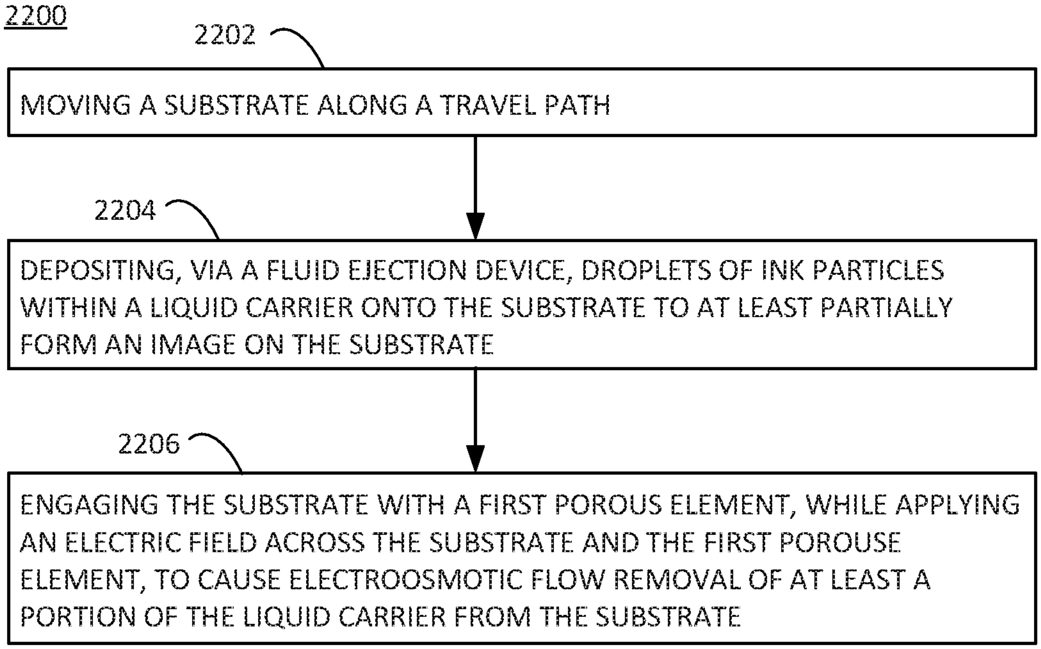
FIG. 20 is a flow diagram schematically representing an example method of image formation.

FIG. 20 is a flow diagram schematically representing an example method. In some examples, method 2200 may be performed via at least some of the same or substantially the same image formation devices, portions, fluid ejection devices, charge emitters, porous elements, electric field applicators, liquid removal elements, elements, control portion, user interface, etc. as previously described in association with FIGS. 1-19C. In some examples, method 1200 may be performed via at least some of the same or substantially the same image formation devices, portions, fluid ejection devices, charge emitters, porous elements, electric field applicators, liquid removal elements, control portion, user interface, etc. other than those previously described in association with FIGS. 1-19C.

As shown at 2202 in FIG. 20, in some examples method 1500 may comprise moving a substrate along a travel path.

As shown at 2204 in FIG. 20, method 2200 may comprise depositing, via a fluid ejection device, droplets of ink particles within a liquid carrier onto the substrate to at least partially form an image on the substrate.

As shown at 2206 in FIG. 20, method 2200 may comprise engaging the substrate with a first porous element, while applying an electric field across the substrate and the belt, to cause electroosmotic flow removal of at least a portion of the liquid carrier from the substrate.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein.

The invention claimed is:

1. An image formation device comprising:
- a support to support movement of a substrate along a travel path;
- a fluid ejection device along the travel path to deposit droplets of ink particles within a liquid carrier onto the substrate to at least partially form an image on the substrate; and
- a first porous element located downstream along the travel path from the fluid ejection device to be in contact against the substrate to remove, via electroosmotic flow through the first porous element, at least a portion of the liquid carrier from the substrate.

2. The image formation device of claim 1, wherein the first porous element comprises a first belt supported by a plurality of rollers, and the device comprises:
- an electrically conductive first roller of the plurality of rollers, the first roller supporting a portion of the first porous element at a contact zone between the first porous element and the substrate,
- wherein an electric field is applied from the support, through the substrate and the first porous element, to the conductive first roller to induce electroosmotic flow of the liquid carrier through the first porous element to pull the liquid carrier away from the substrate.

3. The image formation device of claim 1, wherein the first porous element comprises at least one of a structure and a material to induce the electroosmotic flow.

4. The image formation device of claim 1, comprising:
- a second porous element in contact against the first porous element at a location separated from a location at which the first porous element engages the substrate to remove, via electroosmotic flow through the second porous element, the liquid carrier from the first porous element.

5. The image formation device of claim 4, wherein an electric field is applied to cause the electroosmotic flow from the first porous element through the second porous element.

6. The image formation device of claim 4, wherein the second porous element comprises an outer portion of a first rotatable drum.

7. The image formation device of claim 1, wherein the first porous element comprises an outer portion of a second rotatable drum, and wherein the second rotatable drum comprises a conductive portion,
- wherein an electric field is applied from the support, through the substrate and the outer portion of the second rotatable drum, to the conductive portion of the drum to cause the electroosmotic flow of the liquid carrier through the outer portion of the second rotatable drum to pull the liquid carrier away from the substrate.

8. The image formation device of claim 1, wherein the substrate comprises at least one of:
- an outer portion of a third rotatable drum in rolling contact with the first porous element, wherein a portion of the third rotatable drum comprises a conductive material;
- a second belt supported by an array of spaced apart rollers, wherein the second belt comprises at least one of:
  - a conductive first portion; and
  - a second portion connected to a conductive material.

9. The image formation device of claim 1, wherein the fluid ejection device is to deposit the ink particles within the liquid carrier as an aqueous liquid carrier.

10. The image formation device of claim 1, comprising:
- a first charge emitter downstream along the travel path from the fluid ejection device, and upstream from the first porous element, to emit airborne charges to cause electrostatic fixation of at least the deposited ink particles relative to the substrate,
- wherein the liquid carrier comprises a non-aqueous liquid carrier.

11. An image formation device comprising:
- a support to support movement of a substrate along a travel path;
- a fluid ejection device along the travel path to deposit droplets of ink particles within a liquid carrier onto the substrate to at least partially form an image on the substrate; and
- a first porous element downstream along the travel path from the fluid ejection device;
- a contact zone in which the first porous element is to be in movable contact against the substrate, during application of an electric field across the substrate and the first porous element, to cause electroosmotic flow of the liquid carrier through the first porous element to remove at least a portion of the liquid carrier from the substrate.

12. The image formation device of claim 11, wherein at least a portion of the support for the substrate comprises a conductive material, and wherein the first porous element comprises at least one of:
- an outer portion of a rotatable drum in rolling contact with the substrate, wherein at least a portion of the drum comprises a conductive material; or
- a belt supported by an array of spaced apart rollers, and the contact zone being defined at a respective one of the rollers with the respective one roller comprising a conductive material.

13. A method comprising:
- moving a substrate along a travel path;
- depositing, via a fluid ejection device, droplets of ink particles within a liquid carrier onto the substrate to at least partially form an image on the substrate; and
- engaging the substrate with a first porous element, while applying an electric field across the substrate and a belt, to cause electroosmotic removal of at least a portion of the liquid carrier from the substrate.

14. The method of claim 13, comprising:
- arranging a first support for the substrate to comprise a conductive material; and
- further comprising at least one of:
  - arranging the first porous element as an outer portion of a rotatable drum in rolling contact with the substrate, wherein at least a portion of the drum comprises conductive material; or
  - arranging the first porous element as a belt, which is supported by an array of spaced apart rollers, and supporting engagement of the belt against the substrate via a respective one of the rollers with the respective one roller comprising a conductive material.

15. The method of claim 14, comprising:

applying the electric field to the conductive material of the support and to the conductive material of at least one of the drum and the respective one roller.

* * * * *